(12) United States Patent
Parrott

(10) Patent No.: US 9,279,535 B2
(45) Date of Patent: Mar. 8, 2016

(54) PORTABLE SHOOTING PLATFORM

(76) Inventor: Ryan C Parrott, Carrollton, TX (US)

( * ) Notice: Subject to any disclaimer, the term of this patent is extended or adjusted under 35 U.S.C. 154(b) by 0 days.

(21) Appl. No.: 13/530,817

(22) Filed: Jun. 22, 2012

(65) Prior Publication Data

US 2013/0341472 A1    Dec. 26, 2013

(51) Int. Cl.
| | |
|---|---|
| B68G 5/00 | (2006.01) |
| F16M 11/04 | (2006.01) |
| F16M 11/20 | (2006.01) |
| F16M 11/24 | (2006.01) |
| F16M 13/04 | (2006.01) |
| F41C 33/00 | (2006.01) |

(52) U.S. Cl.
CPC .......... *F16M 11/048* (2013.01); *F16M 11/2014* (2013.01); *F16M 11/2021* (2013.01); *F16M 11/24* (2013.01); *F16M 13/04* (2013.01); *F41C 33/001* (2013.01)

(58) Field of Classification Search
CPC ...... A47B 81/005; F16M 11/00; F41C 23/16; F41A 23/08
USPC ............. 248/118, 118.1, 118.3; 42/94; 5/623, 5/646
See application file for complete search history.

(56) References Cited

U.S. PATENT DOCUMENTS

| | | | |
|---|---|---|---|
| 3,390,477 A | 7/1968 | Galbraith | |
| 4,913,393 A * | 4/1990 | Wood | 248/230.2 |
| 5,351,867 A | 10/1994 | Vest | |
| 5,778,589 A | 7/1998 | Teague | |
| 5,930,933 A | 8/1999 | Schleicher | |
| 6,202,236 B1 | 3/2001 | Price | |
| 6,789,344 B2 | 9/2004 | Cain | |
| 7,243,455 B2 | 7/2007 | Jurk | |
| 2001/0022334 A1 * | 9/2001 | Iwata et al. | 248/118 |
| 2005/0282753 A1 | 12/2005 | Stern et al. | |
| 2008/0054130 A1 | 3/2008 | Castner | |
| 2009/0229162 A1 | 9/2009 | Loya | |

* cited by examiner

*Primary Examiner* — Kimberly Wood

(57) ABSTRACT

A rapidly deployable and adjustable arm support apparatus to be fastened to a user's body or user's apparel to support the arm of the user holding a rifle, bow, camera etc. In accordance with an example embodiment of the present invention, the adjustable arm support platform includes an arm support and a first extension member connected to the arm support. The arm support is adjustable along at least a first dimension and is shaped to accommodate a shooters arm. A second extension member is rotatably connected to the first extension member, wherein the first extension member is rotatably adjustable relative to the second extension member. This flexibility of orientation means that the user's arm can be comfortably supported in virtually any reasonable orientation relative to the shooting platform.

6 Claims, 2 Drawing Sheets

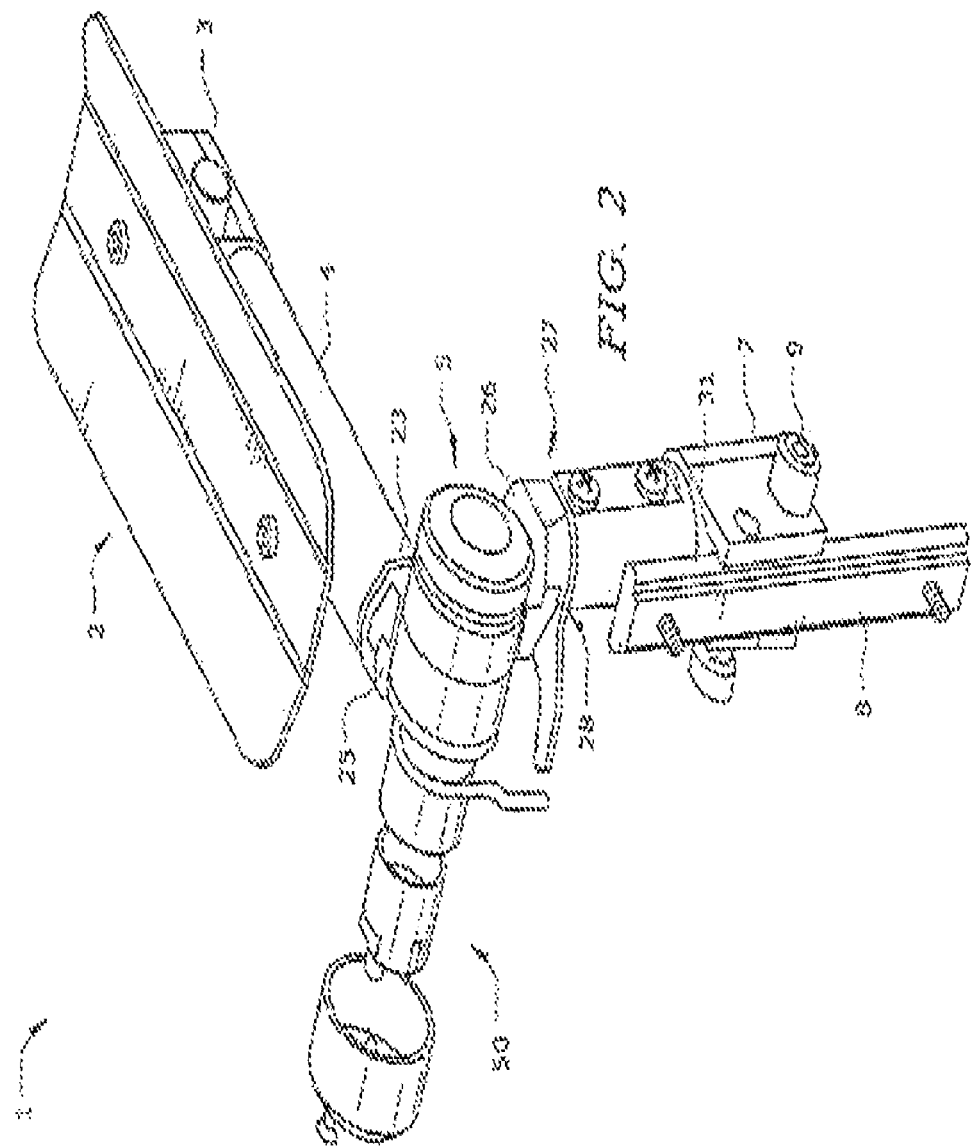

PORTABLE SHOOTING PLATFORM

TECHNICAL FIELD

The present invention relates generally to a portable shooting platform. More particularly, the present invention relates to a portable, adjustable, rapidly deployable armrest attached to the user's torso or arm for steadying the user's arm when supporting a weapon such as a rifle.

BACKGROUND

One of the significant challenges in marksmanship is holding the weapon steady while aiming. Even a slight movement of the human body, and hence the weapon, can reduce accuracy, particularly when shooting at long-range. Accuracy is improved by shooting in the prone position or by using some sort of gun rest. In certain circumstances, however, particularly in combat, law enforcement, and hunting, it is not practical to shoot from the prone position or look for a gun rest. The immediate circumstances demand that you rapidly shoulder the weapon and take aim, also known as shooting off-handed.

Offhand shooting is notoriously difficult, particularly at distance. Various devices have been developed in the past to provide support for a shooters forearm or elbow. U.S. Pat. No. 3,390,477 (Galbraith) entitled "Supporting Device for Sighting Firearms" describes an arm rest for supporting a gun in firing position. US Pub. No. 2009/0229162 (Loya) entitled "Shooting Support" describes a portable armrest fastened to the user for steadying the users arm when supporting a rifle. The shooting support described by Loya is an L-shaped support attached to the shooter's torso by a strap. It includes a simple hinge mechanism that supports an elbow support platform. Both the torso member and the elbow support member are fixed in orientation, other than the angle immediately between them. It is therefore relatively unadjustable and due to its shape and mode of attachment appears to suffer from limited stability as well. Accordingly, what is needed is a stable, attachable, shooting platform that can be readily folded so that it does not restrict the user's freedom of movement when it is in the stored position, but that can be readily deployed when needed. In addition, it should be easily and quickly adjusted in multiple dimensions to provide a stable, comfortable shooting position that works with the shooter's particular physiology.

SUMMARY

It is an object of the present invention to describe a portable shooting platform that is readily adjustable in multiple dimensions, and adopted to steady the arm of a person holding a rifle, archery bow, camera or similar device. In one embodiment, the adjustable arm support platform includes an arm support and a first extension member connected to the arm support. The arm support is adjustable along at least a first dimension and is shaped to accommodate a shooters arm. A second extension member is rotatably connected to the first extension member, wherein the first extension member is rotatably adjustable relative to the second extension member. This flexibility of orientation means that the user's arm can be comfortably supported in virtually any reasonable orientation relative to the shooting platform.

According to another aspect of the present invention, an arm support system includes an arm support connected to a first extension member via extension mount. The arm support is slidably and rotatably adjustable along the first extension member, so that it can be operated in a contracted position or in an extended position or in any other position between contracted and extended positions. This adjustment capability of the arm support accommodates varying lengths of user's arm and different shooting situations. A second extension member is attached to the first extension member, wherein the first extension member is rotatably adjustable relative to the second extension member. A mounting bracket maybe attached to the second extension member which helps in securing the arm support system to the shooter's body.

The arm support system is designed for ease of deployment and portability. In this respect, the arm support system collapses from its use configuration to a compact configuration, close to the shooters body in a manner that it does not interfere with shooter's movement, but can be quickly flipped up to a use configuration.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

For a more complete understanding of example embodiments of the present invention, reference is now made to the following descriptions taken in connection with the accompanying drawings in which:

FIG. 2 is an opposite perspective view of the embodiment.

DETAILED DESCRIPTION

Figure 1:
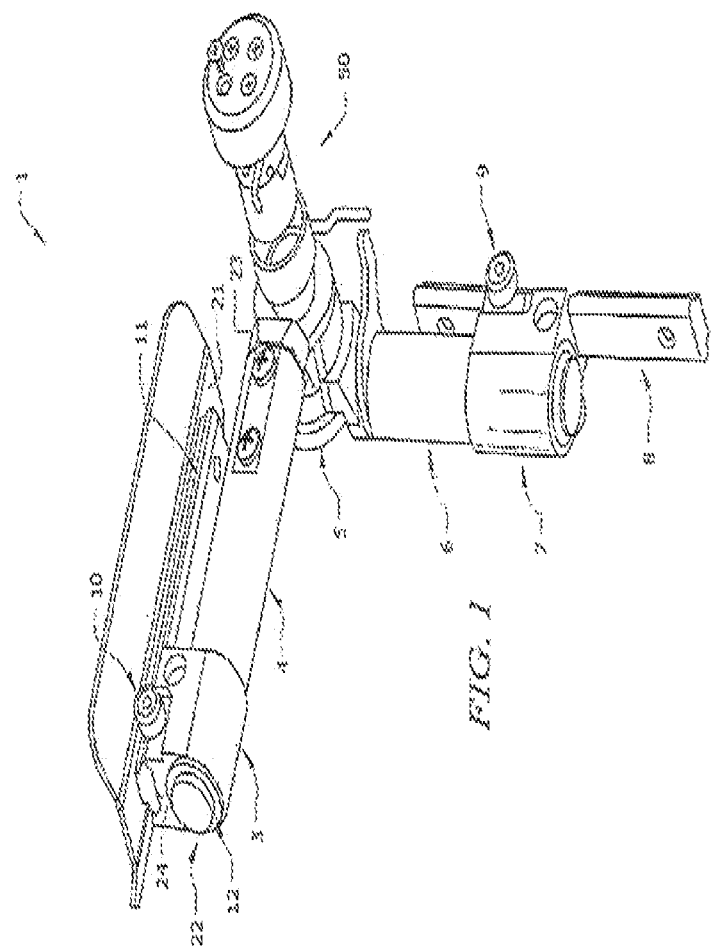
FIG. 1 is a perspective view of an embodiment of an arm support apparatus in accordance with the present application.

An exemplary embodiment of the present invention is described with reference to FIGS. 1 and 2 of the drawings. The portable shooting platform (1) generally includes an arm bracket (2) attached via a first extension mount (3) towards a first end portion (22) of an arm extension rod (4) using a first rail mount (11) extending along the undersurface (21) of the arm bracket (2). The arm bracket (2) is generally shaped to accommodate a shooters arm, but may be made either flatter or made more ergonomically shaped than what is shown here. The first rail mount (11) is a standard rail as is typically used on assault rifles. The first rail mount (11) in conjunction with the first adjustment knob (10) on the first extension mount (3) fitted into groove (24) allows for the arm bracket (2) to be slidably adjusted relative to the arm extension rod (4). In addition, the first extension mount (3) may be rotated about arm extension rod (4) so that the arm bracket (2) can be angled in either direction with respect to the arm extension rod (4). An external retaining ring (12) is attached to the end of the arm extension rod (4) to prevent the first extension mount (3) from sliding off the end of the arm extension rod (4). In an alternative embodiment, the arm bracket (2) may be mounted with a vertical rod that extends into the first extension mount (3). In this embodiment, the first extension mount (3) is modified so that it provides for linear adjustment along the arm extension rod (4). In this configuration, the arm support (2) may be rotated about an axis parallel with the vertical rod, allowing the arm support to "swivel".

Arm extension rod (4), in this embodiment, is connected at its second end portion 23 with, for example, screws (shown) to a first support (25) of variable locking hinge (5) including a lock mechanism (50). Although an exploded view of a specific type of variable locking hinge is shown in the figures, it is understood that any type of variable locking hinge may be utilized here, and there are numerous commercially available hinge devices that could be substituted herein. Extending from the opposite second end (26) of the variable locking hinge (5) and forming a second support (27) is a vest extension rod (6) having a first end (28) fixed to the second support (27). The vest extension rod (6) is mounted to a second rail mount (8) via a second extension mount (7). The second extension mount (7) includes a second adjustment knob (9) that, together with the second rail mount (8), provides for adjustment of the vest extension rod (6) in a generally vertical direction with respect to the second rail mount (8) which is fitted into groove (31). It also provides for angular adjustment of the vest extension rod (6), and therefore the arm bracket (2), with respect to the second rail mount (8).

Thus, the portable shooting platform as shown in FIG. 1, through its capacity for adjustment in multiple dimensions, allows for flexibility in accommodating different size shooters and different shooting situations. In particular, this embodiment of the shooting platform allows for the following adjustments: I) it can be adjusted in the vertical direction by virtue of the second rail mount (8) and second extension mount (7); II) it can be rotated with respect to the second rail mount (8), and hence the shooters body, by virtue of the second extension mount (7) and a vest extension rod (6); III) the angle between the vest extension rod (6) and the arm extension rod (4) can be changed easily and quickly by virtue of the variable locking hinge (5); IV) the position of the arm bracket (2) can be slidably changed with respect to the arm extension rod (4); V) the arm bracket (2) can be rotatably adjusted about an axis substantially parallel to the arm extension rod (4); and VI) for the alternative embodiment discussed above, the arm support (2) may swivel. The method by which these adjustments are affected also provides for maximum convenience to the shooter. Once the shooter has adjusted the shooting platform according to his preferences, the arm bracket (2) can be readily folded close to the shooters body by virtue of the variable locking hinge (5) so that it does not interfere with his movement, but can then be immediately flipped up into a preset position to support the shooters arm as he acquires his target.

The shooter attaches the portable shooting platform, in this embodiment, to his torso by screwing the second rail mount (8) into a bracket that can be embedded within, for example, an H-gear vest. The H-gear vest loops into the restraining loops of the H-gear vest, as will be well understood to those of skill in the art. In an alternative embodiment, the second rail mount (8) screws into a torso plate sewn into the H-gear vest rather than using the removable H-gear bracket. It should be understood that although these attachment mechanisms have been described in relation to H-gear, that other vests, jackets, belts, suspenders, or other articles of heavy clothing could be substituted. In another embodiment, the portable shooting platform attaches to the shooter's support arm with, for example, straps or Velcro or some combination of both. There are many suitable ways of attaching the arm support bracket to the shooter's arm, however. For example, one could also use the H-gear attachment mechanism of the prior embodiment, except in this instance the H-gear bracket would be secured by restraining loops attached to the underside of the shooter's arm, rather than those present on the H-gear vest, or boiled to a plate embedded within the arm portion of clothing.

It will be appreciated that although specific parts have been shown here for sake of clarity, there are numerous alternatives that can be substituted. For example, instead of using the combination of the extension rods (4), (6) and extension mounts (3), (7), a telescoping tube that locks in place by twisting could be substituted for one or both of the extension rods and mounts. In addition, tubes could be used instead of the extension mounts (3) (7), so that the extension rods would fit within the tubes and be adjustable relative to the tubes. In this embodiment the tubes could either be connected to each other by a variably locking hinge or the extension rods could be connected via the hinge, or some permutation thereof (i.e., a tube could be connected to an extension mount via, the hinge, etc.). In addition, instead of using the rail mounts (11), (8), both the arm bracket (2) and the H-gear bracket could have a rail-like protrusion permanently attached or cast. Moreover, the portable shooting platform could be attached to the shooter's torso using high-strength Velcro, snaps, or any other suitable method of affixing the platform to the shooter's torso. Similarly, a ratchet system like those found on adjustable wrench sets could be substituted for the variable locking hinge. Pneumatic or hydraulic hinges could also be substituted.

The shooting platform is generally constructed of aluminum and steel. It may also be made out of any light, rigid material, including titanium, Teflon, plastic, alloy, or other composite material giving appropriate strength to the portable shooting platform.

The detailed description of the above preferable embodiments is to describe the technical features and spirit of the present invention and should not be used to limit the scope of the present invention. On the contrary, the preferable embodiments and its variations and equivalents thereof all fall within the scope of the present invention. For example, the support could be used for more than just shooting; indeed, it could be utilized for any application where the user needs to steady their arm. Two such applications are surgery and painting. In these examples, it may be beneficial to include a forearm extension rod that is rotatably attached to the arm extension rod (4), along with a forearm bracket similar to arm bracket (2). In this manner the surgeon would have complete arm support, freeing his wrists, for surgery for example, and relieving the tension that comes from long hours of detail-oriented work. Therefore, the scope of the present invention should be most broadly explained according to the foregoing description and includes all possible variations and equivalents.

What is claimed is:

1. A portable arm support platform for providing stability to a weapon supporting arm of a shooter and enable steadier aiming of a weapon, comprising:

an arm bracket to receive and support a portion of the weapon supporting arm of the shooter upon an upper surface of said arm bracket, an undersurface of said arm bracket having fixed thereto a first longitudinally extending rail mount;

an elongate arm extension rod with a first end portion and a second end portion, the first portion for supporting said arm bracket toward said first end portion of said elongate arm extension rod;

a first extension mount adapted for slidable and axially rotatable engagement with said elongate arm extension rod and engaged with said first longitudinally extending rail mount to enable slidable movement of said first extension mount with respect to said first longitudinally extending rail mount, said first extension mount having a first adjustment knob for adjusting the position of said first extension mount with respect to said first longitudinally extending rail mount and being prevented from coming off the first end portion of said arm extension rod by a retaining ring;

a variable locking hinge having a first support, said first support being fixed to the second end portion of said elongate arm extension rod to structurally support said elongate arm extension rod and a second support, said variably locking hinge being rotatable to change the relative angle of said first support with respect to said second support and a lock mechanism to fix said variably locking hinge in a selected angular position;

an elongate vest extension rod having a first end fixed to the second support of said variable locking hinge and a second end;

a second extension mount adapted for slidable and rotatable engagement with said elongate vest extension rod and also adapted to be engaged with a second longitudinally extending rail mount adapted for being secured to the shooter to enable slidable movement of said second extension mount with respect to said shooter, said second extension mount having an adjustment knob for adjusting the position of said second rail extension mount with respect to said second longitudinally extending rail mount and being prevented from coming off the second end of said vest extension rod by a retaining ring;

said variable locking hinge being rotatable between a first folded position and a second support position so that the arm support platform is in a position to support the weapon supporting arm of the shooter while aiming a weapon.

2. A portable arm support platform as set forth in claim 1 wherein said first extension mount includes a grooved section to receive said first extension mount.

3. A portable arm support platform as set forth in claim 1 wherein said second extension mount includes a grooved section to receive said second longitudinally extending rail mount.

4. A portable arm support platform as set forth in claim 1 wherein said variable locking hinge can be set into a preselected preferred angular position so that after folding the arm bracket into storage position, it can quickly be unfolded into the preselected preferred support position.

5. A portable arm support platform as set forth in claim 1 wherein the arm support platform, elongate arm extension rod and elongate vest extension rod are constructed of aluminum.

6. A portable arm support platform as set forth in claim 1 wherein the arm support platform, elongate arm extension rod and elongate vest extension rod are constructed from a material selected from the group consisting of titanium, Teflon, plastic, alloy or composite.

* * * * *